United States Patent
Meinert et al.

(10) Patent No.: US 10,086,886 B1
(45) Date of Patent: Oct. 2, 2018

(54) FRAME-SIDE AIR DEFLECTOR

(71) Applicant: GM GLOBAL TECHNOLOGY OPERATIONS LLC, Detroit, MI (US)

(72) Inventors: Frank W. Meinert, Shelby Township, MI (US); Kuo-huey Chen, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/637,258

(22) Filed: Jun. 29, 2017

(51) Int. Cl.
*B62D 35/02* (2006.01)
*B62D 37/02* (2006.01)
*B62D 35/00* (2006.01)

(52) U.S. Cl.
CPC ............. *B62D 35/02* (2013.01); *B62D 37/02* (2013.01); *B62D 35/00* (2013.01)

(58) Field of Classification Search
CPC ............................... B62D 35/02; B62D 37/02
USPC ........................................... 296/180.4, 180.1
See application file for complete search history.

(56) References Cited

U.S. PATENT DOCUMENTS

| 5,301,996 A | * | 4/1994 | Theis | B60B 39/026 180/903 |
| 2015/0015026 A1 | * | 1/2015 | Nojima | B62D 35/02 296/180.1 |
| 2015/0210324 A1 | * | 7/2015 | Kojima | B62D 35/005 296/180.1 |

OTHER PUBLICATIONS

Keiichi Taniguchi et al., "A Study of Drag Reduction Devices for Production Pick-Up Trucks", Mar. 28, 2017.

* cited by examiner

*Primary Examiner* — Joseph D. Pape

(57) ABSTRACT

A frame-side air deflector for an automotive vehicle is disclosed. The air deflector includes a first portion oriented substantially vertical with respect to an underside of the automotive vehicle, a second portion oriented substantially perpendicular to the first portion, and a transition portion connecting the first and second portions. In some aspects, the first portion curves outward and away from a centerline of the vehicle and the second portion angles downward from the underside of the vehicle such that as the vehicle travels in a forward direction, air is directed downward, outward, and away from one or more rear-mounted components of the vehicle.

10 Claims, 2 Drawing Sheets

FRAME-SIDE AIR DEFLECTOR

INTRODUCTION

The present invention relates generally to the field of vehicles and, more specifically, to frame-side-mounted air deflectors.

A moving vehicle develops a positive air pressure on surfaces which are presented in the direction of travel. The positive air pressure, combined with lower pressure on surfaces opposite to the direction of travel, generates a drag force on the vehicle which can reduce fuel economy and increase carbon dioxide emissions. In particular, body-on-frame vehicles having a complex and rough underbody structure are prone to aerodynamic drag.

SUMMARY

Embodiments according to the present disclosure provide a number of advantages. For example, embodiments according to the present disclosure reduce drag forces on a vehicle by reducing flow entrainment into the vehicle underbody. Reducing flow entrainment reduces pressures on the rear tires, axles, and other components while increasing the pressure behind the tailgate. In some embodiments, risk of damage to the deflector is minimized as the deflector does not extend below the frame.

In one aspect, an air deflector for an automotive vehicle includes a first portion oriented substantially vertical with respect to an underside of the automotive vehicle, a second portion oriented substantially perpendicular to the first portion, and a transition portion connecting the first and second portions. The first portion curves outward and away from a centerline of the vehicle and the second portion angles downward from the underside of the vehicle such that as the vehicle travels in a forward direction, air is directed downward, outward, and away from one or more rear-mounted components of the vehicle.

In some aspects, the first portion is coupled to a vehicle frame and the air deflector does not extend below a bottom edge of the vehicle frame.

In some aspects, the first portion is coupled to a vehicle frame and the air deflector extends below a bottom edge of the vehicle frame.

In some aspects, the second portion angles downward from an upper edge of the vehicle frame.

In some aspects, the first portion includes a concave surface having a radius of curvature larger than a radius of curvature of the transition portion.

In some aspects, the second portion has a first width at an upper edge and a second width at a lower edge and the first width is greater than the second width.

In some aspects, the first portion, the second portion, and the transition portion are molded from a plastic material.

In some aspects, the first portion, the second portion, and the transition portion are unitarily formed from a metallic material.

In another aspect, an automotive vehicle includes a frame, a body coupled to the frame, the body including at least one rocker panel, at least one air deflector coupled to the frame, the air deflector directing air outward away from the frame and downward away from an underside of the body.

In some aspects, the air deflector includes a first portion oriented substantially vertical with respect to the underside of the vehicle and a second portion oriented substantially perpendicular to the first portion.

In some aspects, the first portion curves outward and away from a centerline of the vehicle and the second portion angles downward from the underside of the vehicle.

In some aspects, a bottom edge of the first portion is substantially coplanar with a bottom edge of the frame.

BRIEF DESCRIPTION OF THE DRAWINGS

The present disclosure will be described in conjunction with the following figures, wherein like numerals denote like elements.

Figure 1:
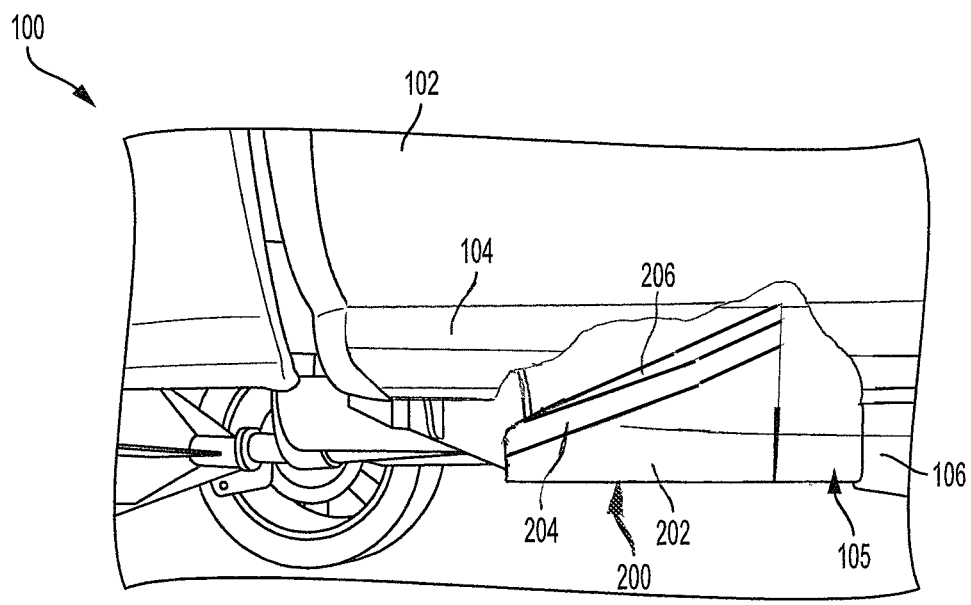
FIG. 1 is a schematic illustration of a side view of an air deflector for a vehicle, according to an embodiment.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

The complex configuration and rough underbody structures of body-on-frame (BOF) vehicles contribute to aerodynamic drag, particularly due to air flow entrainment. The increased aerodynamic drag has a negative effect on fuel economy and carbon dioxide emissions.

In some embodiments, an air deflector is coupled to an exterior-facing side of the vehicle frame in a space between the frame and the rocker section of the body. The air deflector deflects air downward and outward, away from the underbody of the vehicle, producing beneficial changes in surface pressures and a net reduction in aerodynamic drag.

Figure 2:
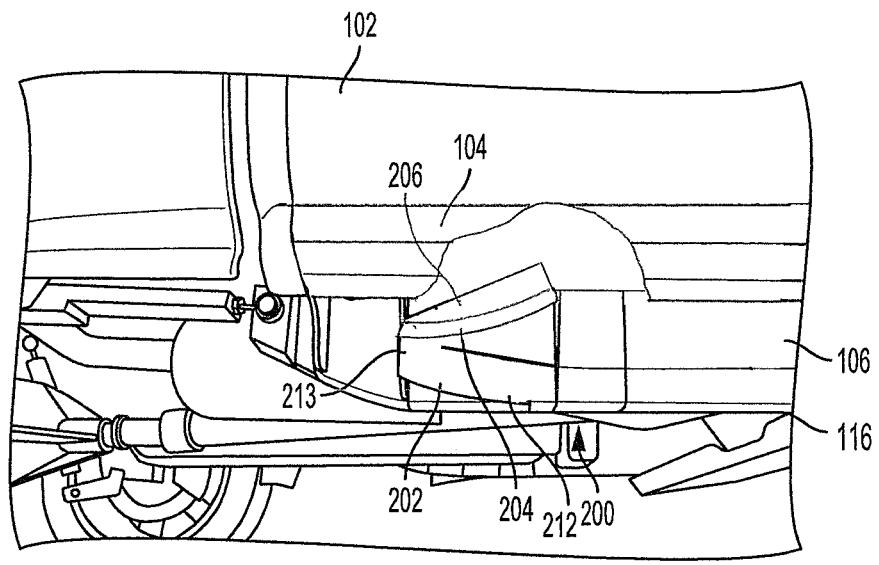
FIG. 2 is a schematic illustration of an underside view of the air deflector of FIG. 1.
Figure 3:
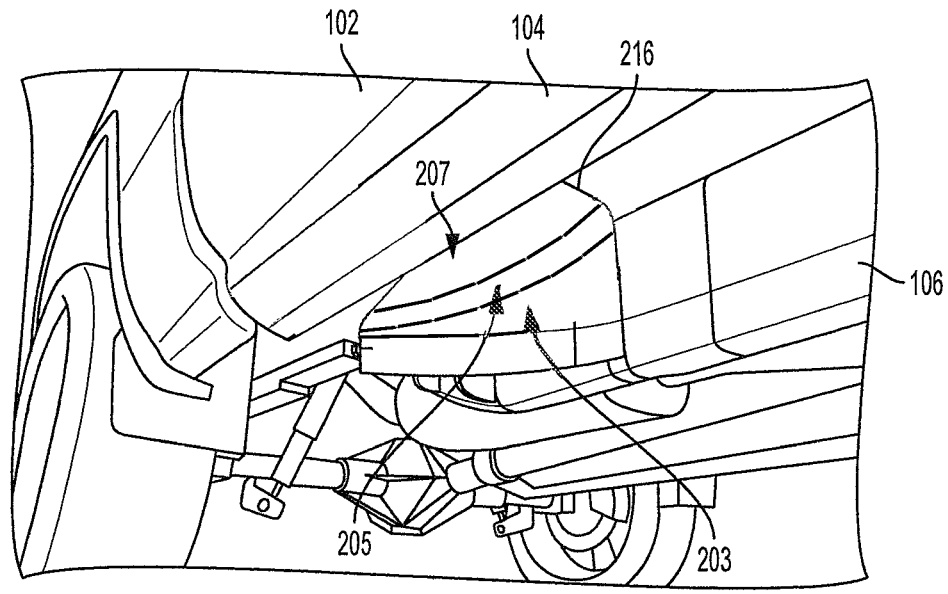
FIG. 3 is a schematic illustration of another underside view of the air deflector of FIG. 1 looking toward the rear of the vehicle, according to an embodiment.
Figure 4:
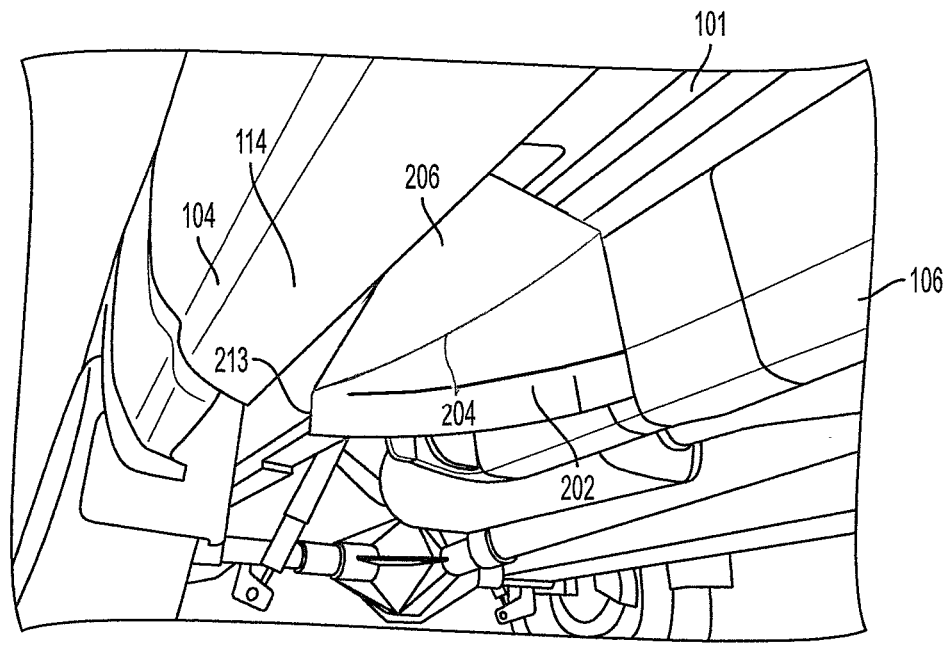
FIG. 4 is an enlarged underside view of the air deflector of FIG. 1.

FIGS. 1-4 illustrate a frame-side air deflector, according to an embodiment. A partial view of a vehicle 100 includes a body side panel 102, a rocker panel 104, and a frame 106. FIGS. 1-3 illustrate a rocker panel 104 having a cutout portion removed to better illustrate the air deflector. In some embodiments, the vehicle 100 has a body-on-frame construction. An air deflector 200 is coupled to the frame 106. As the vehicle travels forward (that is, the vehicle 100 shown in FIGS. 1-4 travels from left to right), the air deflector 200 deflects air downward and outward, away from the rear wheels, axles, and other components, reducing the velocity of air flowing underneath the vehicle 100 and at least partially shielding the rear components from impacts with airborne particles such as small rocks, etc.

In some embodiments, the air deflector 200 is mounted near the end of the cab portion of the vehicle 100. In some embodiments, the air deflector 200 is mounted forward of the rear wheels and other rear-mounted components such that as the vehicle 100 travels in a forward direction, air is directed downward, outward, and away from one or more rear-mounted components of the vehicle 100.

In some embodiments, the air deflector 200 includes a first portion 202. The first portion 202 is coupled to a side surface 105 of the frame 106 such that the first portion 202 is substantially parallel to the side surface 105 at and adjacent to the plane of connection. A second portion 206 extends at an angle downward from the top of the frame 106. A transition portion 204 connects the first portion 202 and the second portion 206. In some embodiments, the transition portion 204 is a curved surface having a radius, such as the surface 205 shown in FIG. 3. In some embodiments, the transition portion 204 is an angled corner.

In some embodiments, the air deflector 200 is formed as an integral piece. In some embodiments, the first portion 202, the transition portion 204, and the second portion 206 are separate pieces joined together by any mechanical or adhesive means to form the air deflector 200. In some embodiments, the air deflector 200 is made of a rigid plastic material, for example and without limitation. In some embodiments, the air deflector 200 is a unitarily formed molded plastic piece. In some embodiments, the air deflector 200 is made of metal, such as, for example and without limitation, aluminum.

In some embodiments, the first portion 202 is substantially equal to the height of the frame 106 and the air deflector 200 does not extend below the frame 106. In some embodiments, the first portion 202 extends below the frame 106. In some embodiments, a bottom edge 212 of the first portion is substantially coplanar with a bottom edge 116 of the frame 106.

As shown in FIG. 3, the first portion 202 includes a curved surface 203 that curves outward and away from the frame 106. The curved surface 203 of the first portion 202 curves outward and away from a centerline of the vehicle 100. The curved surface 203 is substantially vertical, that is, generally perpendicular to the underside of the vehicle 100. The curved surface 203 directs air outward and away from the rear tires of the vehicle 100, thus reducing air pressure on the rear tires, axles, and other components. In some embodiments, the curved surface 203 is a concave surface that has a radius of curvature larger than a radius of curvature of the transition portion 204.

In some embodiments, the curved surface 203 of the first portion 202 extends from the side surface 105 of the frame 106 outward towards the rocker panel 104 such that an outward edge 213 of the curved surface 203 approaches or is adjacent to an edge 114 of the rocker panel 104. In some embodiments, the outside edge 213 is substantially perpendicular to a longitudinally-directed bottom edge of the rocker panel 104. In some embodiments, the outside edge 213 has a length of approximately 2-3 inches. With reference to FIG. 2, in some embodiments, the first portion 202 does not extend below a bottom edge 116 of the frame 106. In some embodiments, the first portion 202 extends below the bottom edge 116 of the frame 106.

With continued reference to FIG. 3, the second portion 206 includes an angled surface 207. The angled surface 207 extends at an angle from the top of the frame 106 towards the bottom of the rocker panel 104. Due to the outward curvature of the first portion 202, a width of the second portion 206 adjacent to the point of connection between the air deflector 200 and the frame 106 is wider than a width of the second portion 206 adjacent to the edge 213. In some embodiments, a leading edge 216 of the second portion 206 is substantially perpendicular to the frame 106 and the first portion 202. The angled surface 207 directs air downward and away from the underside of a vehicle cab 101. In some embodiments, the angled surface 207 does not extend below the frame 106.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about 1 to about 3," "about 2 to about 4" and "about 3 to about 5," "1 to 3," "2 to 4," "3 to 5," etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An air deflector for an automotive vehicle, comprising:
   a first portion oriented substantially vertical with respect to an underside of the automotive vehicle;
   a second portion oriented substantially perpendicular to the first portion; and
   a transition portion connecting the first and second portions;
   wherein the first portion curves outward and away from a centerline of the vehicle and the second portion angles downward from the underside of the vehicle such that as the vehicle travels in a forward direction, air is directed downward, outward, and away from one or more rear-mounted components of the vehicle.

2. The air deflector of claim 1, wherein the first portion is coupled to a vehicle frame and the air deflector does not extend below a bottom edge of the vehicle frame.

3. The air deflector of claim 1, wherein the first portion is coupled to a vehicle frame and the air deflector extends below a bottom edge of the vehicle frame.

4. The air deflector of claim 2, wherein the second portion angles downward from an upper edge of the vehicle frame.

5. The air deflector of claim 1, wherein the first portion comprises a concave surface having a radius of curvature larger than a radius of curvature of the transition portion.

6. The air deflector of claim 1, wherein the second portion has a first width at an upper edge and a second width at a lower edge and the first width is greater than the second width.

7. The air deflector of claim 1, wherein the first portion, the second portion, and the transition portion are molded from a plastic material.

8. The air deflector of claim 1, wherein the first portion, the second portion, and the transition portion are unitarily formed from a metallic material.

9. An automotive vehicle, comprising:
   a frame;
   a body coupled to the frame, the body comprising at least one rocker panel; and
   at least one air deflector coupled to the frame, the air deflector directing air outward away from the frame and downward away from an underside of the body, the at least one air deflector comprising a first portion oriented substantially vertical with respect to the underside of the body, a second portion oriented substantially perpendicular to the first portion, and a transition portion connecting the first and second portions;
   wherein the first portion curves outward and away from a centerline of the vehicle and the second portion angles downward from the underside of the body.

10. The automotive vehicle of claim 9, wherein a bottom edge of the first portion is substantially coplanar with a bottom edge of the frame.

* * * * *